(12) United States Patent  
Jendrny

(10) Patent No.: US 8,932,418 B2  
(45) Date of Patent: Jan. 13, 2015

(54) HYBRID JOINING METHOD FOR LAP JOINTS

(75) Inventor: Joerg Jendrny, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 488 days.

(21) Appl. No.: 12/316,473

(22) Filed: Dec. 12, 2008

(65) Prior Publication Data

US 2009/0194224 A1  Aug. 6, 2009

Related U.S. Application Data

(60) Provisional application No. 61/008,958, filed on Dec. 21, 2007.

(51) Int. Cl.
*B32B 7/08* (2006.01)

(Continued)

(52) U.S. Cl.
CPC . *B32B 3/00* (2013.01); *B21J 15/02* (2013.01); *B21J 15/14* (2013.01); *B21J 15/147* (2013.01); *F16B 5/04* (2013.01); *F16B 11/006* (2013.01)
USPC ............. 156/92; 156/253; 156/277; 156/292; 156/295; 428/172

(58) Field of Classification Search
CPC  B29C 66/1122; B29C 66/43; B29C 47/0019; B29C 65/526; B32B 38/14; B32B 3/00; B32B 3/02; B32B 3/06; B32B 3/08; B32B 3/085
USPC ......... 156/60, 71, 91, 92, 153, 196, 211, 219, 156/242, 244.11, 246, 250, 256, 258, 267, 156/290, 291, 292, 293, 294, 295, 304.1, 156/304.5; 428/544, 594, 600, 601, 77, 98, 428/99, 156, 167, 172
See application file for complete search history.

(56) References Cited

U.S. PATENT DOCUMENTS 2,908,073 A * 10/1959 Dulin ............................ 156/172  
4,556,592 A    12/1985 Bannink, Jr.

(Continued)

FOREIGN PATENT DOCUMENTS

DE   19539682   6/1996  
DE   19649617   6/1998  
DE   19737966   8/1998

*Primary Examiner* — Philip Tucker  
*Assistant Examiner* — Brian R Slawski  
(74) *Attorney, Agent, or Firm* — Greer, Burns & Crain Ltd.

(57) ABSTRACT

The invention relates to a method of producing an overlapping hybrid connection between two or more components. A hybrid connection in the meaning of the invention is characterized by adhesively bonding and producing mechanical spot joint connections between two joining parts, the adhesive layer being arranged in the region of the mechanical joint connections. The method according to the invention is carried out in the following method steps: purposefully removing material from one or more of the components or purposefully applying material to one or more of the components in the region of the lap joint to be produced to form one or more projections, applying adhesive to one or more of the components in the region of the lap joint to be produced, overlapping the components, pressing the components together in the region of the lap joint to press the projections against the overlapping component(s) and producing one or more mechanical spot joint connections on the projections in the overlap region. The method according to the invention enables a desired uniform adhesive material thickness to be obtained reliably by using the projection as spacers and also enables a mechanical spot joint connection to be produced without curing the adhesive. The invention further relates to a component comprising projections for obtaining a defined adhesive layer thickness and the use of the method and the component in an aircraft.

7 Claims, 4 Drawing Sheets

(51) Int. Cl.
 *B29C 65/00* (2006.01)
 *B32B 37/00* (2006.01)
 *B32B 38/04* (2006.01)
 *B32B 38/14* (2006.01)
 *B29C 65/48* (2006.01)
 *B32B 3/00* (2006.01)
 *B21J 15/02* (2006.01)
 *B21J 15/14* (2006.01)
 *F16B 5/04* (2006.01)
 *F16B 11/00* (2006.01)

(56) References Cited

U.S. PATENT DOCUMENTS

| | | | | |
|---|---|---|---|---|
| 5,849,393 | A | * | 12/1998 | Slattery .................. 428/172 |
| 6,083,604 | A | * | 7/2000 | Haraga et al. ............ 428/132 |
| 2004/0241323 | A1 | * | 12/2004 | Ylitalo et al. ............ 427/258 |
| 2005/0043103 | A1 | * | 2/2005 | Prucher ................... 464/134 |
| 2006/0115320 | A1 | * | 6/2006 | Wood et al. .............. 403/232.1 |
| 2007/0068717 | A1 | * | 3/2007 | Austin et al. ............. 180/90 |

* cited by examiner

HYBRID JOINING METHOD FOR LAP JOINTS

CROSS-REFERENCE TO RELATED APPLICATIONS

This application claims the benefit of U.S. Provisional Application No. 61/008,958, filed Dec. 21, 2007, the entire disclosure of which is herein incorporated by reference.

FIELD OF THE INVENTION

The invention relates to a method for producing an overlapping hybrid connection between two or more components.

BACKGROUND OF THE INVENTION

Methods of this type are known from the aircraft manufacturing industry in particular. In this field, a hybrid connection is characterised by the adhesive bonding and mechanical spot joining of two joining parts, the adhesive layer being arranged in the region of the mechanical joining points. With the conventional hybrid connection methods, it is difficult to accurately obtain a uniform adhesive layer thickness which should remain unchanged even when being loaded by the mechanical joint connections themselves.

With a known hybrid joining method, in which adhesive bonding and riveting are carried out simultaneously, glass beads with a predetermined diameter are added for example to the adhesive used in order to adjust the thickness of an adhesive layer between the two parts to be joined, and this ensures that the thickness does not fall below a minimum thickness, corresponding to the diameter, of the adhesive layer. Owing to the rivet connection and the related high force of pressure in the region of the rivets involved in this procedure, the glass beads used are pressed into the respective surface coating of the joining parts, which results in both the surface coating and, to some extent, the glass beads being destroyed and so the level of precision achievable with this method cannot be ensured.

Other methods which involve both adhesive and rivet connections initially adhesively bond the joining parts to one another in order to subsequently produce the rivet connection after the adhesive has cured. In order to obtain a defined adhesive layer thickness, the joining parts are clamped in devices after the adhesive layer has been applied and remain fixed therein until curing has occurred. A drawback of this type of method is the long process time, since clamping the joining parts is time-consuming and it is further necessary to wait until the adhesive has cured.

In a further known method involving both adhesive and rivet connections, the layer thickness of an adhesive between two joining parts is adjusted by the viscosity of the adhesive. In this case, after the adhesive layer has been applied, rivet holes are produced and the joining parts are riveted to one another before the adhesive layer cures. Owing to the force of pressure produced by the riveting process, adhesive is squeezed out of the gap between the joining parts, adhesive of a thickness which can be predetermined from the viscosity of the adhesive remaining in said gap. The layer thickness achieved by this type of method is generally too small to achieve a sufficient level of mechanical adhesion and the adhesive is further not completely uniformly distributed. Accumulations of adhesive or vacuities ("pockets") are formed locally.

SUMMARY OF THE INVENTION

It is therefore one of the objects of the invention to reduce or eliminate one or more of the disadvantages described above. One particular object of the invention is to propose a hybrid joining method, in which a defined adhesive layer thickness can be achieved reliably and uniformly without the adhesive applied having to cure before producing the mechanical spot joint connection and without the adhesive layer thickness being changed after production of the mechanical spot joint connection.

Accordingly, a method of producing an overlapping hybrid connection of two or more components comprises the following method steps:

purposefully removing material from one or more of the components or purposefully applying material to one or more of the components in the region of the overlap joint to be produced, in order to form one or more projections, applying adhesive to one or more of the components in the region of the overlap joint to be produced, overlapping the components, pressing the components together in the region of the overlap joint to press the projections against the overlapping component(s), producing one or more mechanical spot joint connections on the projections in the overlap region.

By purposefully removing material in the region of the lap joint to be produced, it is possible to form, in the joining part concerned, integrated projections which can be used as spacers and which are produced by making recesses in planar regions during the material removal process. The cross-section of the projections corresponds to the recessed planar regions and the height of the projections is a function of the depth of material removal. As an alternative to the removal process, material may also be applied to one or more of the components in such a way that projections can be formed directly by this application process.

Adhesive is applied to one or more of the components to be connected in the region of the lap joint to be produced. By overlapping the components to be connected and subsequently pressing said components together, the projections of one joining part are pressed against one of the surfaces of a second joining part which faces the overlap region in such a way that there is a defined distance between the two joining parts. This distance corresponds to the height of the projections and forms a gap which is filled with adhesive after application of the method according to the invention.

Mechanical spot joint connections, such as rivet, bolt or screw connections between the two joining parts, are produced by a conventional sequence of necessary steps which begins, for example, by drilling both joining parts. In the method according to the invention, the holes are preferably to be arranged so as to pass through the projections, since there is material contact at that location between the two joining parts and a mechanical spot joint connection cannot narrow the gap formed by the projections and filled with adhesive. In addition, the mechanical spot joint connection also does not lose its bias in the region of the holes as a result of the uninterrupted material contact between the joining parts, since none of the adhesive located under the fixed rivet, the fixed pin or the fixed screw flows away after the bias is applied owing to the viscosity thereof, thus enabling a consistent connection quality to be ensured.

The method according to the invention therefore enables a desired adhesive layer thickness to be reliably pre-set by purposefully removing or applying material and also enables mechanical joint connections to be produced without curing the adhesive. The connection method is a particularly time-saving method and does not require any clamping devices to control the thickness of the adhesive layer. The formation of pockets in the adhesive is effectively prevented and there is further no contact between the tool used to produce the holes and the adhesive, thus preventing soiling and the need for regular cleaning or replacement of the tool and also preventing adhesive residues which adhere to the tool during drilling being propelled against the surrounding surfaces.

Furthermore, a component in accordance with the present invention comprises a surface having one or more projections for producing an overlapping hybrid connection to a second component in an overlap region, the surfaces of the projections extending parallel to the surface of the second component and the distance between the surfaces of the projections and the surface of the component corresponding to a desired adhesive layer thickness between the components to be connected.

BRIEF DESCRIPTION OF THE DRAWINGS

The present invention is explained in more detail below using preferred exemplary embodiments and with reference to the attached figures of the drawings, in which.

In the figures, like reference numerals refer to identical or functionally identical components unless otherwise stated.

DETAILED DESCRIPTION OF THE INVENTION

Figure 1A:
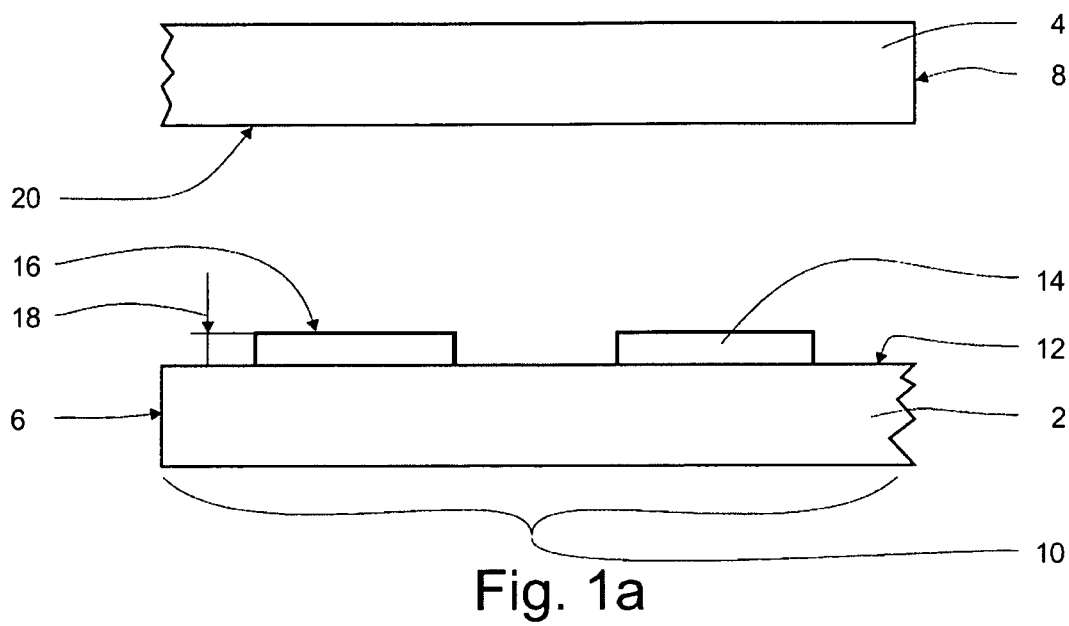
FIG. 1a: is a side view of two components to be connected by the method according to the invention.

FIG. 1a shows a first component 2 which is to be connected to a second component 4 by the method according to the invention. The components 2, 4 are configured by way of example as planar, metal sheet-like components and only a portion thereof is shown in FIG. 1a. An outer edge 6 of the component 2, together with an outer edge 8 of the component 4, delimits an overlap region 10, within which the components 2, 4 which overlap in this region will be connected to one another.

Initially, i.e. before the method according to the invention is used, the component 2 has a completely planar connection surface, which is modified by a material removal process in such a way that it attains the shape of the connection surface 12 shown in FIG. 1. The removal process may for example be a chemical etching process, in which material is removed from some regions, material in desired locations remaining unaffected owing to this material having previously been covered with a coating or the like. Mechanical removal of material by means of milling, or physical removal by electrical discharge machining and the like is also possible and is also appropriate in the case of particularly pronounced profiling which extends deep into the material. The most suitable removal process is to be selected in particular depending on the speed of removal to be expected and the costs incurred by the respective processes. Since etching methods are also used to some extent in the production of skinplates for the outer skin of an aircraft in order to remove material in some regions to reduce weight, it is appropriate to use a further or the same etching method for the method according to the invention. After the surface 12 has been treated, the predominantly planar surface 12 of the treated component 2 which faces the second component 4 in the overlap region 10 comprises a plurality of projections 14 which are used as spacers in the method according to the invention and comprise planar surfaces 16 which are arranged parallel to the surface 12. The projections 14 have a height 18 which corresponds to the desired adhesive layer thickness. After the profiling of the surface 12 of the component 2 has been completed, an adhesive is applied in a drop-like manner, as a spray or as adhesive beads by means of pressure application, a doctor blade, a spatula, a dispenser or other methods and devices. The two components 2 and 4 are subsequently pressed together in such a way that the surfaces 16 of the projections are pressed against a surface 20 of the component 2 pointing towards the component 2. The two components are fixed in this position by suitable devices which are also used for conventional skinplate components. The two components 2 and 4 can subsequently both be drilled through the centre of the projections 14.

In the embodiment shown in the figures, rivet connections are used as the mechanical spot joint connections. However, since this is merely one embodiment, the method according to the invention is not limited to producing a hybrid connection with rivet connections and instead all of the aforementioned mechanical spot joint connections are also possible. Non-exhaustive examples of rivet connections include punch rivets, lockbolts, tubular rivets and blind rivets.

In this embodiment, the actual rivet connection is produced after the final step of drilling.

As an alternative to removing material from the component 2, the projections 14 can be produced by applying a suitable material. Suitable materials include metal materials, thermoplastic polymers, thermosetting polymers or adhesives. A curing process is required when applying adhesives and plastic materials in order to fix the shape of the projections 14. In order not to conflict with the object according to the invention, using rapidly curing materials is recommended. Possible application methods include any manual or automatic material application methods, for example screen printing or metal printing.

Figure 1B:
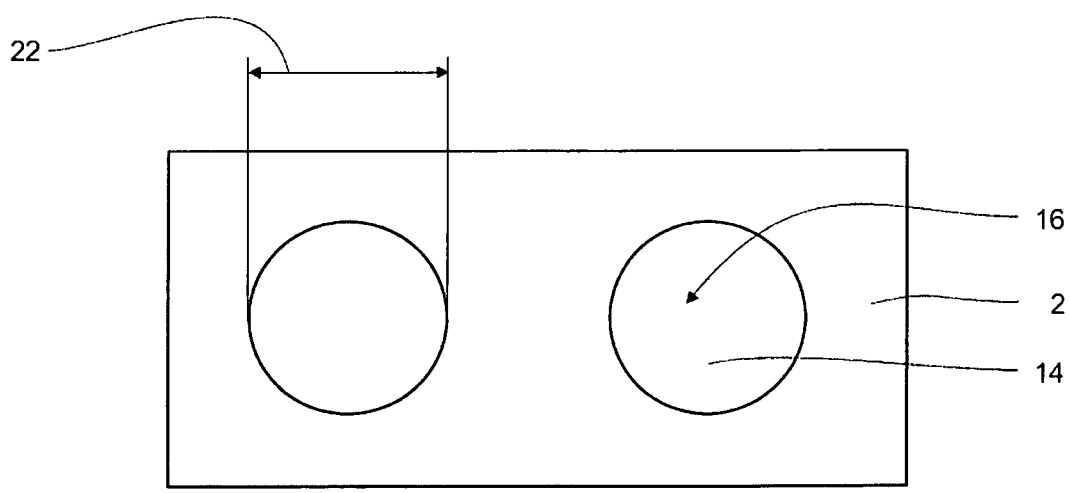
FIG. 1b: is a plan view of a treated component which is to be connected by the method according to the invention.

FIG. 1b is a plan view of the treated component 2 with a profile surface 12 and shows, by way of example, projections 14 which have a circular cross-section of diameter 22. The diameter 22 is preferably greater than the diameter of the heads of the rivets to be used, corresponds approximately to the extent of the pressure cone of an individual rivet connection and thus ensures sufficient force is transferred from the rivet connection into the connected components 2 and 4. The diameter 22 may alternatively be selected so as to be sufficiently large for a rivet hole which is offset by a slight distance to still lie completely within the corresponding projection 14.

Figure 2:
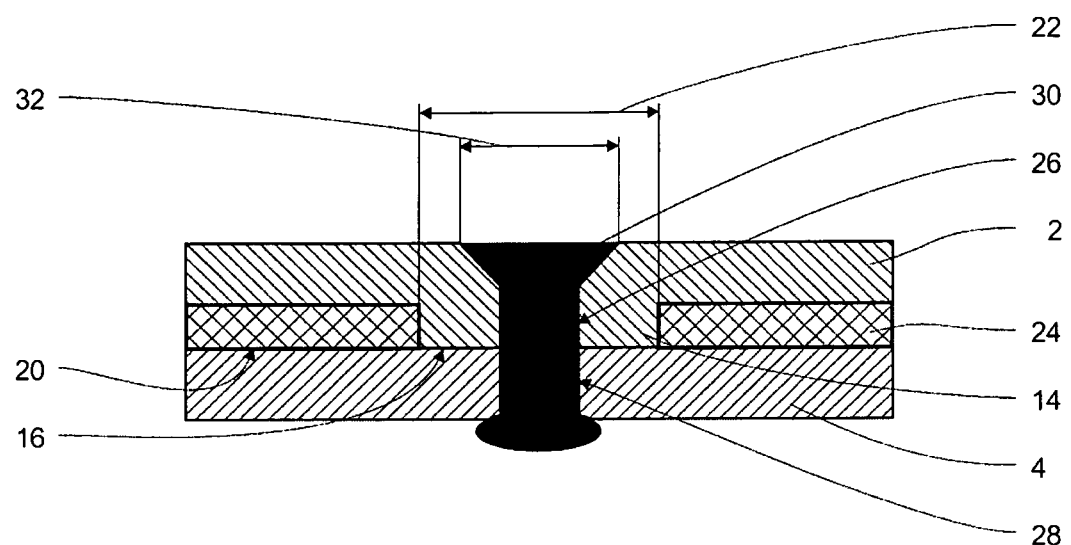
FIG. 2: is a lateral sectional view of two components which are connected by the method according to the invention.

FIG. 2 shows the components 2 and 4 which have been connected by the method according to the invention. The projection 14 of the component 2 rests flat against the surface 20 of the component 4. Between the components 2 and 4 there is an adhesive 24 which completely fills the gap established by the projection 14 between the components 2 and 4.

The components 2 and 4 have a hole 26 and 28 respectively, the hole 26 in part being a countersink with a pressure angle of approximately 90° in order to completely receive a rivet head 30. The rivet head 30 has an outer diameter 32 in accordance with which the diameter 22 of the projection 14 is dimensioned in a specific aforementioned ratio, said diameter also depending substantially on the shape of the rivet head 30 and the pressure cone of the rivet connection determined thereby.

The holes 26 and 28 do not come into contact with the adhesive 24 since they are preferably first produced after the components 2 and 4 have been pressed together in such a way that the adhesive originally located between the surface 16 of the projection 14 and the surface 20 of the component 4 has already been squeezed into the remaining mass of adhesive adjacent to the projection 14 by the force of pressure. The tool used for drilling therefore does not come into contact with the adhesive 24 and is therefore not soiled, the rivet connection is also not impaired by the effect of the adhesive and no adhesive residues are propelled onto the outer surfaces of components.

In addition to being able to very precisely control the layer thickness of the adhesive 24, a very advantageous aspect of the method according to the invention is that, owing to the use of projections 14 as spacers, the rivet connections cannot lose the bias thereof as a result of their defined shape. Furthermore, the rivet connections can be produced directly after applying the adhesive 24 without having to wait for the adhesive 24 to be cured. The thickness of the adhesive layer is not dependent on external fixing devices and remains constant, even and substantially unaffected by external influences. The formation of adhesive pockets and a resulting wave-like shape on the outer surface is prevented and the adhesive layer thickness remains substantially constant over the entire overlap region 10.

Figure 3:
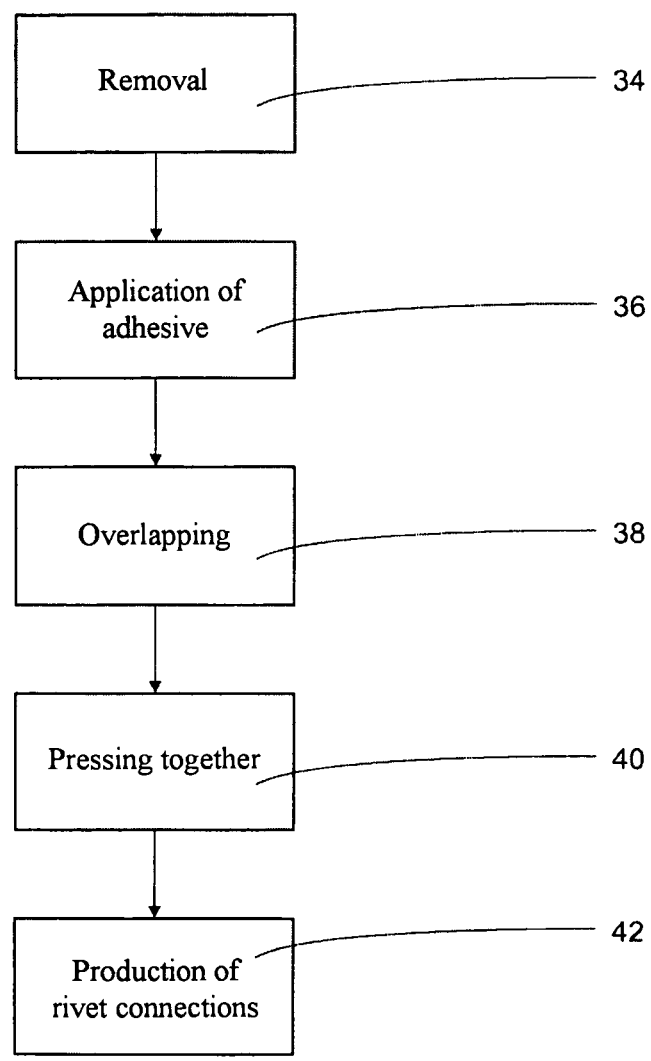
FIG. 3: is a schematic block diagram of a variant of the method according to the invention

FIG. 3 is a summary diagram of a variant of the method according to the invention. After material has been removed from one or more of the components 2 and 4 to be connected to form projections 14, adhesive 24 is applied 36 within the overlap region 10 on one or more of the facing surfaces 12 and 20 of the components 2 and 4. After the components 2 and 4 have subsequently been overlapped 38 and pressed together 40, which includes the step of fixing the components 2 and 4, rivet connections are produced 42 on the respective projections 14 in the overlap region 10. It is not necessary for the adhesive 24 to harden and so the rivet connections can be produced directly after the adhesive 24 has been applied and the components 2 and 4 have been pressed together.

Figure 4:
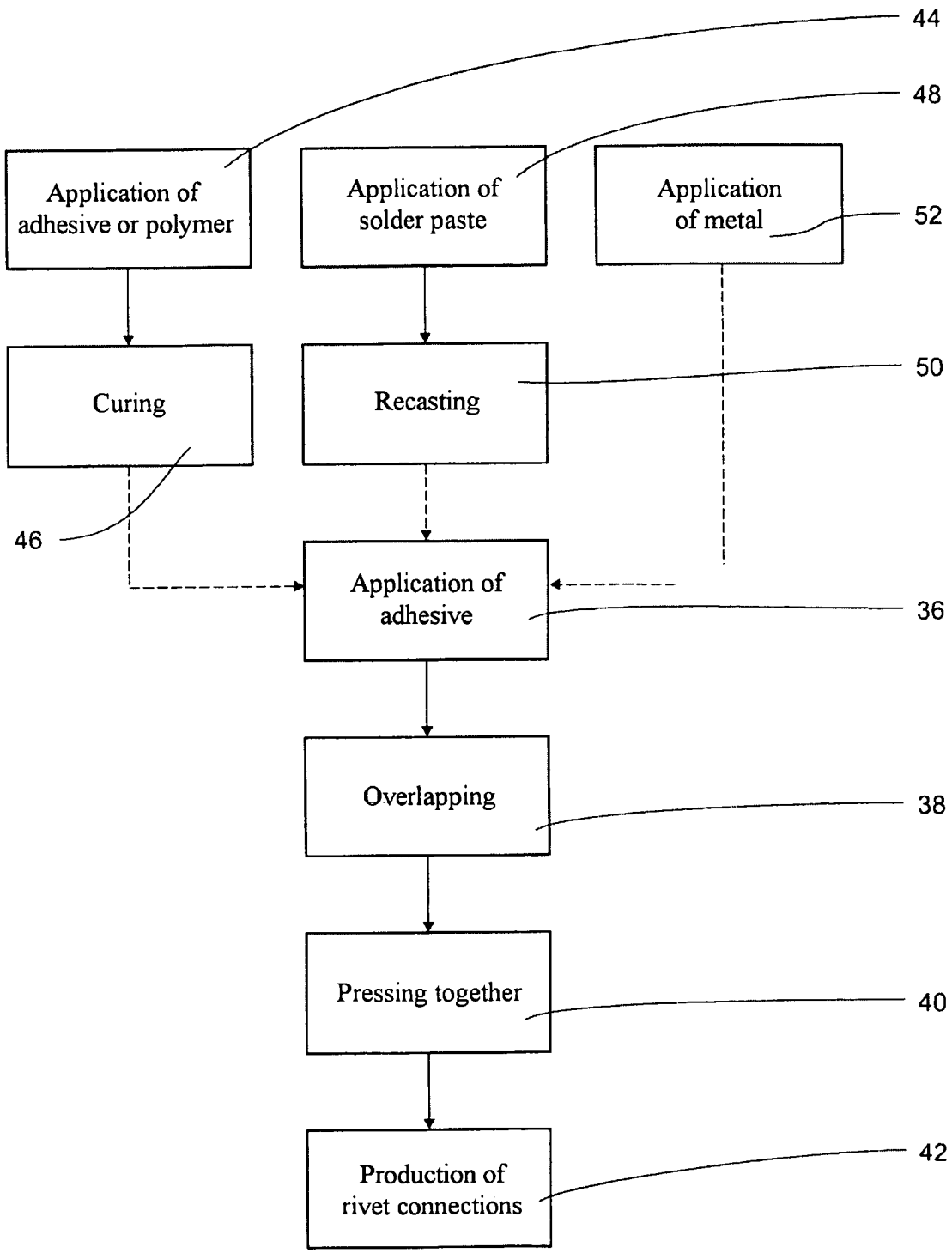
FIG. 4: is a schematic block diagram of a further variant of the method according to the invention.

Finally, another variant of the method according to the invention is shown in FIG. 4. Projections 14 are produced on one or more of the components 2 and 4 to be connected by applying an adhesive or a polymer 44 and subsequently curing 46 said adhesive or polymer. Alternatively, the projections 14 may be formed by applying a solder paste 48 and subsequently recasting 50 said paste or by directly applying metal 52. Adhesive 24 is subsequently applied 36 to one or more of the facing surfaces 12 and 20 of the components 2 and 4 within the overlap region 10. After the components 2 and 4 have been overlapped 38 and pressed together 40, rivet connections are produced 42 on the respective projections 14 in the overlap region 10.

The method according to the invention enables a desired adhesive layer thickness to be reliably predetermined by purposefully removing or applying material, and also enables mechanical joint connections to be produced without curing the adhesive. The time-saving connection method does not require any clamping devices to control the thickness of the adhesive layer, pocket formation in the adhesive is effectively prevented and there is no contact between the tool producing the holes and the adhesive. The rivet connections shown and the aforementioned removal and application methods are to be understood as embodiments which do not limit the invention. It is further conceivable to use any material application and removal methods which may be used in the method according to the invention.

The invention claimed is:

1. A method of producing an overlapping hybrid connection of at least two components of an aircraft, the method comprising:
    providing at least two components of an aircraft, wherein each component comprises at least one smooth connection surface, purposefully applying material to the at least one smooth connection surface of one component in the region of the overlap joint to be produced, in order to form projections comprising a continuous closed surface facing the corresponding smooth connection surface of the other component to connect the one component with its predominantly smooth connection surface to the corresponding smooth connection surface of the other component, wherein at least one of the projections is formed by a metal material as the material purposefully applied to the at least one smooth connection surface of one component in the region of the overlap joint to be produced by metal printing,
    applying adhesive to at least one of the components in the region of the overlap joint to be produced,
    overlapping the components,
    pressing the components together in the region of the overlap joint to press the projections of the one component against the other overlapping component, such that the adhesive originally located between surfaces of the projections and surfaces of the component is squeezed into a remaining mass of adhesive adjacent to the projections,
    providing through-holes penetrating the components after the projections of the component are pressed against the other component, such that the holes do not come into contact with the adhesive applied in the region of the overlap joint; and
    producing one or more mechanical spot joint connections on the projections in the overlap region using the through-holes.

2. The method according to claim 1, wherein substantially circular projections are formed, the diameter thereof being greater than the diameter of heads of rivets to be used.

3. The method according to claim 1, wherein the adhesive is applied by bead application, doctor blade, extrusion, spraying, drop application or by means of a metering process using a dispenser.

4. The method according to claim 1, wherein metal sheet-like components are connected to one another.

5. The method according to claim 1, wherein structural components, skinplates and/or metal sheet-like components of an aircraft are connected to one another.

6. The method according to claim 1, wherein at least one of the components is a structural component, a skinplate or a metal sheet-like component of an aircraft.

7. The method according to claim 1, wherein a material purposefully applied to the at least one smooth connection surface of one component in the region of the overlap joint to be produced is a thermoplastic polymer, a thermosetting polymer or an adhesive to form at least one further projection.

\* \* \* \* \*